United States Patent [19]
Okuchi et al.

[11] Patent Number: 5,921,671
[45] Date of Patent: Jul. 13, 1999

[54] LIGHT-DISTRIBUTING LENS OF HEAD LAMP FOR VEHICLES

[75] Inventors: Hiroaki Okuchi, Anjo; Takashi Sato, Yokohama, both of Japan

[73] Assignees: Denso Corporation, Kariya; Stanley Electric Co., Ltd., Tokyo, both of Japan

[21] Appl. No.: 08/733,793

[22] Filed: Oct. 18, 1996

[30] Foreign Application Priority Data

Oct. 18, 1995 [JP] Japan ................................. 7-270037

[51] Int. Cl.$^6$ ................................ F21M 3/12; F21V 8/00
[52] U.S. Cl. ......................... 362/511; 362/558; 362/327
[58] Field of Search ............................... 362/31, 32, 61, 362/327, 511, 558

[56] References Cited

U.S. PATENT DOCUMENTS

| | | | |
|---|---|---|---|
| 4,106,078 | 8/1978 | Inoue | 362/327 |
| 5,257,168 | 10/1993 | Davenport et al. | 362/32 |
| 5,295,047 | 3/1994 | Windross | 362/32 |
| 5,343,367 | 8/1994 | Davenport et al. | 362/32 |
| 5,365,412 | 11/1994 | Koppolu et al. | 362/32 |
| 5,434,754 | 7/1995 | Li et al. | 362/32 |
| 5,436,806 | 7/1995 | Kato | 362/32 |
| 5,488,545 | 1/1996 | Kato et al. | 362/32 |
| 5,499,166 | 3/1996 | Kato et al. | |
| 5,515,244 | 5/1996 | Levins et al. | 362/32 |

FOREIGN PATENT DOCUMENTS

623780  11/1994  European Pat. Off. .
6068702  3/1994  Japan .

*Primary Examiner*—Laura Tso
*Attorney, Agent, or Firm*—Pillsbury Madison & Sutro LLP

[57] ABSTRACT

A light-distributing lens which may be employed in head lamps for vehicles is provided. The light-distributing lens includes an entrance surface, a pair of reflecting side surfaces, and an exit surface. The pair of reflecting side surfaces include a plurality of reflecting side portions arranged vertically of the light-distributing lens so as to form vertically compressed light-distributed zones, respectively. Each of the light-distributed zones includes a direct light-distributed portion formed by a portion of the light transmitted directly from the entrance surface without undergoing the total reflection on the reflecting side surfaces and reflected light-distributed zones formed on both sides of the direct light-distributed zone by a portion of the light transmitted from the entrance surface which has undergone the total reflection on the reflecting side surfaces. An angle which the reflecting side portions of one of the pairs make with each other in the horizontal direction is different from that which the reflecting side portions of the other(s) of the pairs make with each other so that each of dark areas formed between the direct light-distributed portion and the reflected light-distributed portions of the light-distributed zone formed by one of the pairs are brightened by one of the direct light-distributed portion and the reflected light-distributed portions of the light-distributed zone of the other(s) of the pairs.

6 Claims, 6 Drawing Sheets

LIGHT-DISTRIBUTING LENS OF HEAD LAMP FOR VEHICLES

BACKGROUND OF THE INVENTION

1. Technical Field

The present invention relates generally to a light-distributing lens of a head lamp for use in vehicles, and more particularly to a light-distributing lens designed to emit light transmitted through an optical fiber to form a high intensity light zone and a wide spread light zone ahead of the vehicle.

2. Background of Related Art

U.S. Pat. No. 5,499,166 issued on Mar. 12, 1996 to Kato et al., assigned to the same assignee as that of this application discloses a lighting device having a high intensity zone-forming lens and a wide spread zone-forming lens, which will be discussed below using the same reference numbers as employed in the above publication.

The wide spread zone-forming lens includes an entrance surface 26c, a pair of right and left reflecting surfaces, and two exit surfaces 26a and 26b. The light emerging from an optical fiber 30 enters the entrance surface 26c. The right and left reflecting surfaces direct the light transmitted from the entrance surface 26c forward in total reflection. The exit surfaces 26a and 26b emit part of the light emerging from the entrance surface 26c or direct light which has not undergone total reflection on the reflecting surfaces and the remainder of light which has undergone the total reflection on the reflecting surfaces in forward directions, respectively, to form a smaller light-distributed area C1 and a larger light-distributed area C2 (see FIG. 4(B) of the publication). The smaller light-distributed area C1 is defined by a direct light-distributed portion formed by the direct light emerging from the exit surface 26a and right and left reflected light-distributed portions formed at the right and left sides of the direct light-distributed portion by the reflected light emitted from the reflecting surface 26a. The larger light-distributed area C2 is defined by a direct light-distributed portion formed by the remainder of the direct light emerging from the exit surface 26b and the remainder of the reflected light emitted from the reflecting surface 26b.

The above prior art lens structure, however, has the following drawbacks.

The pair of right and left reflecting surfaces are common to the exit surfaces 26a and 26b. Specifically, the angle at which the right and left reflecting surfaces expand forward is unchanged in the exit surfaces 26a and 26b, so that image pitches (i.e., intervals) between the direct light-distributed portion and the right and left reflected light-distributed portions formed by the light emitted from the exit surface 26a are substantially equal to those between the direct light-distributed portion and the right and left reflected light-distributed portions formed by the light emitted from the exit surface 26b. This produces dark areas outside and between the direct light-distributed portion and the right and left reflected light-distributed portions formed by the light emitted from the exit surface 26a which overlaps with only part of the light-distributed area formed by the light emitted from the exit surface 26. Therefore, only certain parts of the dark areas are brightened by the light emitted from the exit surface 26b, resulting in uneven distribution of brightness of the light-distributed areas formed by the wide spread zone-forming lens.

SUMMARY OF THE INVENTION

It is therefore a principal object of the present invention to avoid the disadvantages of the prior art.

It is another object of the present invention to provide a light-distributing lens for use in a head lamp of a vehicle which is designed to emit light forward to form a light-distributed pattern ahead of the vehicle showing an even distribution of illuminance.

According to one aspect of the present invention, there is provided a light-distributing lens for a head lamp of a vehicle which comprises: (a) an entrance surface into which light emitted from a light source is inputted; (b) an exit surface formed opposite the entrance surface along a horizontal line extending in a lengthwise direction of the light-distributing lens to emit the light entering the entrance surface to form a wide spread zone; and (c) a pair of reflecting side surfaces formed between the entrance surface and the exit surface so as to direct a portion of the light entering the entrance surface to the exit surface in total reflection, the pair of reflecting side surfaces including at least first and second pairs of reflecting side portions which pairs are arranged in a vertical direction substantially perpendicular to the horizontal line of the light-distributing lens to form first and second light-distributed zones ahead of the exit surface each including a direct light-distributed portion formed by a portion of the light transmitted directly from the entrance surface without undergoing the total reflection on the reflecting side surfaces and reflected light-distributed zones formed on both sides of the direct light-distributed zone by a portion of the light transmitted from the entrance surface which has undergone the total reflection on the reflecting side surfaces, an angle which the reflecting side portions of the first pair make with each other in the horizontal direction of the light-distributing lens being different from that which the reflecting side portions of the second pair make with each other so that each of dark areas formed outside and between the direct light-distributed portion and the reflected light-distributed portions of the first light-distributed zone are brightened by one of the direct light-distributed portion and the reflected light-distributed portions of the second light-distributed zone.

In the preferred mode of the invention, the exit surface includes first and second curved surfaces which emit light transmitted from the first and second pairs of reflecting side portions, respectively, and which have curvatures different from each other.

The pair of reflecting side surfaces further includes a third pair of reflecting side portions arranged on the first and second pairs of reflecting side portions in the vertical direction of the light-distributing lens to form a third light-distributed zone including a direct light-distributed portion formed by a portion of the light transmitted directly from the entrance surface without undergoing total reflection on the reflecting side surfaces and reflected light-distributed zones formed on both sides of the direct light-distributed zone by a portion of the light transmitted from the entrance surface which has undergone total reflection on the reflecting side surfaces.

The exit surface includes first, second, and third curved surfaces which emit light transmitted from the first, second, and third pairs of reflecting side portions, respectively, and which have curvatures different from each other in the vertical direction of the light-distributing lens.

The first and second curved surfaces are curved in the vertical direction of the light-distributing lens. The curvatures of the first and second curved surfaces are different from each other so that focal lengths of light emitted from the first and second curved surfaces differ.

The first and second curved surfaces have horizontal curvature different from each other so that lengths of the first and second light-distributed zones in the horizontal direction of the light-distributing lens are also differ.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding purposes only.

In the drawings.

DESCRIPTION OF THE PREFERRED EMBODIMENT

Figure 1:
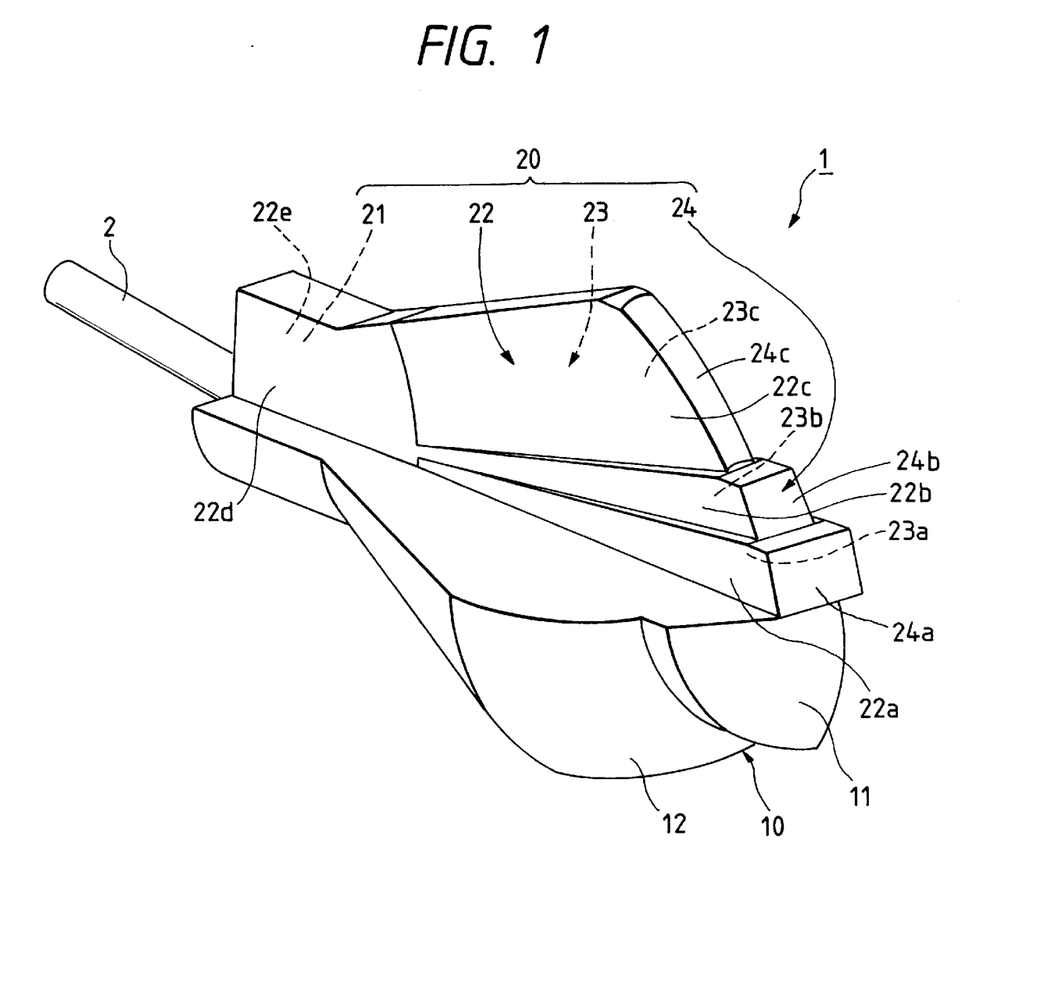
FIG. 1 is a perspective view which shows a light-distributing lens for use in a head lamp of a vehicle according to the present invention.

Referring now to the drawings, FIG. 1 illustrates a light-distributing lens 1 which is suitable for head lamps of four-wheel automobiles. However, such a head lamp may also be employed in vehicles such as trains, air planes, and ships.

The light-distributing lens 1 is made of a transparent material such as acrylate resin and includes generally a high intensity zoneforming lens 10 for forming a high intensity zone light ahead of the automobile and a wide spread zone-forming lens 20 for forming a vertically compressed light-distributed pattern or wide spread light zone ahead of the automobile. The high intensity zone-forming lens 10 and the wide spread zone-forming lens 20 may be formed with a one-piece member as well as separate members.

Figure 2:
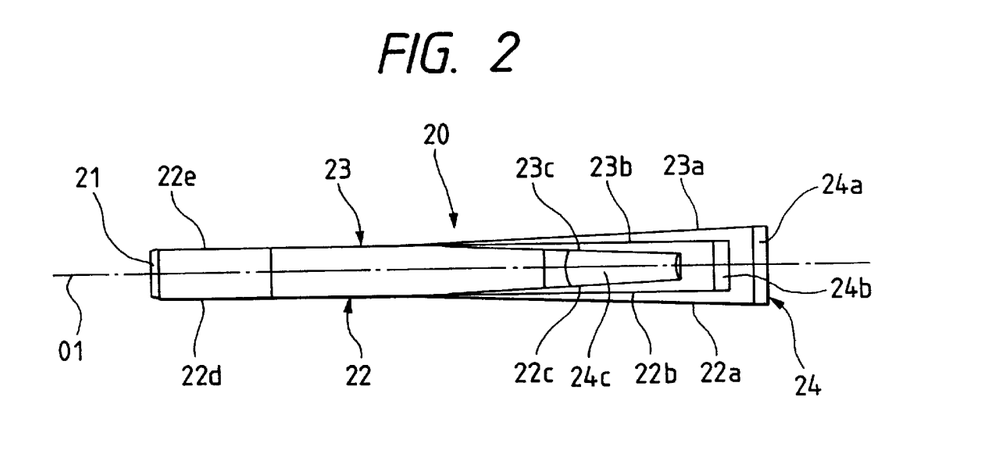
FIG. 2 is a plan view which shows a wide spread zone-forming lens of the light-distributing lens in FIG. 1.
Figure 3:
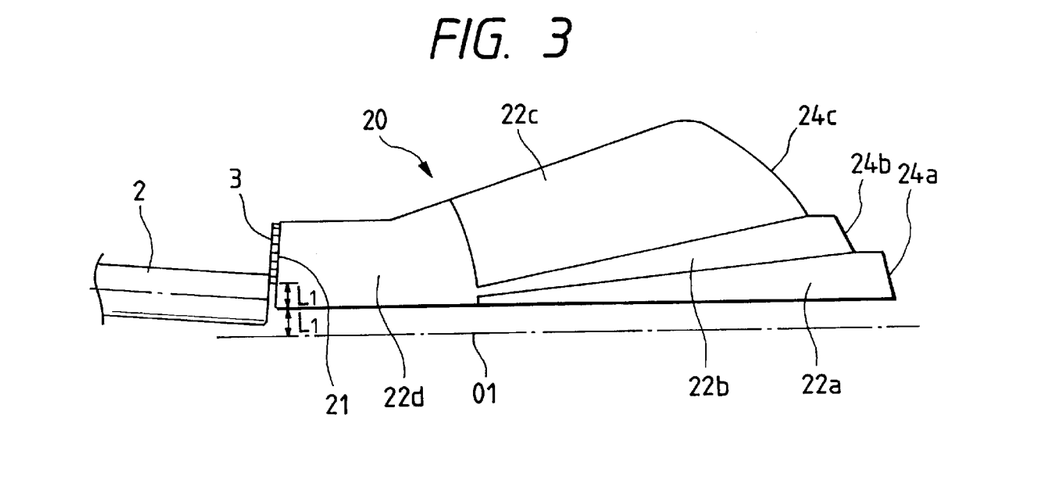
FIG. 3 is a side view of FIG. 2.

The wide spread zone-forming lens 20 includes, as shown in FIGS. 1 to 3, an entrance surface 21, a pair of right and left reflecting surfaces 22 and 23, and an exit surface 24. The entrance surface 21 is formed at the rear end of the lens 20 and receives the light emerging from an optical fiber 2 through a cut line-forming shade 3. The right and left reflecting surfaces 22 and 23 direct the light from the entrance surface 21 in total reflection to the exit surface 24. The exit surface 24 emits forward part of the light from the entrance surface 21, that is, direct light which has not undergone total reflection by the reflecting surfaces 22 and 23 and the remainder of the light from the entrance surface 21 which has undergone total reflection by the reflecting surfaces 22 and 23.

Figure 4A:
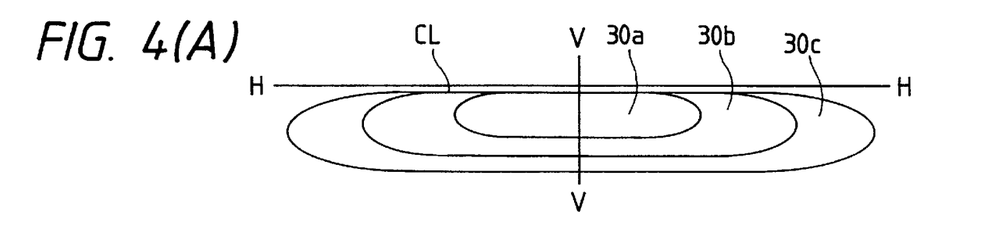
FIG. 4(A) is an illustration which shows a wide spread zone formed by the wide spread zone-forming lens shown in FIG. 2.

The reflecting surfaces 22 and 23 include common reflecting portions 22e and 22d and three pairs of right and left reflecting portions 22a, 23a, 22b, 23b, 22c, and 23c which are, as can be seen in FIG. 3, arranged vertically. The three pairs 22a, 23a, 22b, 23b, 22c, and 23c, as clearly shown in FIG. 2, extend horizontally at different angles to the horizontal center line 01 (i.e., the optical axis of the lens 20), respectively. Specifically, the lower reflecting portions 22a and 23a expand forward so that the light emitted from the longitudinal exit surface 24 will spread horizontally at the smallest angle to the center line 01 among the three pairs 22a to 23c to form the smallest light-distributed zone 30a, as shown in FIG. 4(A). The middle reflecting portions 22b and 23b extend parallel to each other at an angle of zero (0) to the longitudinal center line 01 so that the light emitted from the exit surface 24 will spread horizontally at a middle angle to form the middle light-distributed zone 30b. The upper reflecting portions 22c and 23c extend forward at a negative angle to the longitudinal center line 01 to form a tapered portion of the lens 20 so that the light emitted from the exit surface 24 will spread horizontally at the largest angle to form the largest light-distributed zone 30c. Upper lines CL (also called cut line or cutoff) of the three light-distributed zones 30a to 30c, as clearly shown in FIG. 4(A), coincide with each other. This is, as shown in FIG. 3, achieved by defining the horizontal center line 01 of the wide spread zone-forming lens 20 away from the bottom (i.e., a total reflection surface) of the wide spread zone-forming lens 20 at an interval $L_1$, that is equal to a distance between the bottom of the wide spread zone-forming lens 20 and the lower edge of the cut line-forming shade 3. In other words, as will be described later, bring the optical axes of lenses having exit surfaces 24a 24b, and 24c into agreement with each other.

The exit surface 24, as shown in FIG. 3, consists of the lower exit surface 24a, the middle exit surface 24b, and the upper exit surface 24c which are arranged vertically along an arc having a given curvature. The lower exit surface 24a is defined by the lower reflecting portions 22a and 23a. The middle exit surface 24b is defined by the middle reflecting portions 22b and 23b. The upper exit surface 24c is defined by the upper reflecting portions 22c and 23c. The lower exit surface 24a is formed with a portion of the circumferential surface of the so-called cylindrical lens and is curved vertically at the smallest curvature among the exit surfaces 24a to 24c to emit the light at the smallest vertical angle so that the light-distributed zone 30a, as shown in FIG. 4(A), has the smallest height in the vertical direction. Similarly, the middle exit surface 24b is formed with a portion of the circumferential surface of the so-called cylindrical lens and is curved vertically at a middle curvature between those of the exit surfaces 24a and 24c to emit the light at a middle vertical angle so that the light-distributed zone 30b, as shown in FIG. 4(A), has a middle height in the vertical direction. The upper exit surface 24c is, as shown in FIG. 3, curved vertically at a given curvature and forms, as shown in FIG. 2, a concave lens along a circumferential center line thereof. Specifically, the upper exit surface 24c is curved inward at a preselected curvature so that the light-distributed zone 30c has a greater horizontal length as compared with when the upper exit surface 24c is merely formed with a portion of the circumferential surface of the cylindrical lens. The vertical curvature of the upper exit surface 24c is greatest among the three exit surfaces 24a to 24c so that the light-distributed zone 30c, as shown in FIG. 4(A), has the greatest height in the vertical direction. Specifically, the curvatures of the upper, middle, and lower exit surfaces 24a to 24c are different from each other so that the lights emitted therefrom have different focal lengths.

Figure 4B:
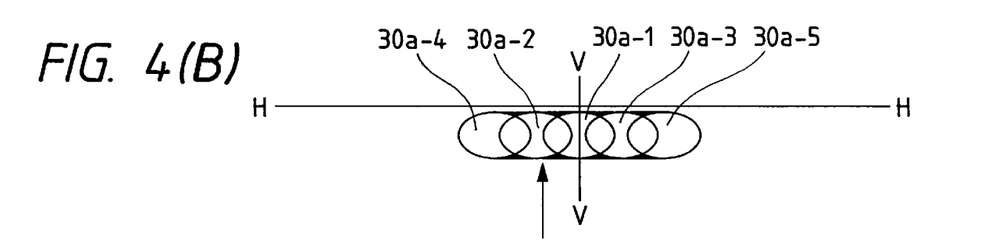
FIG. 4(B) is an illustration which shows a light-distributed zone formed by light emitted from a lower exit surface of a light-distributing lens.
Figure 4C:
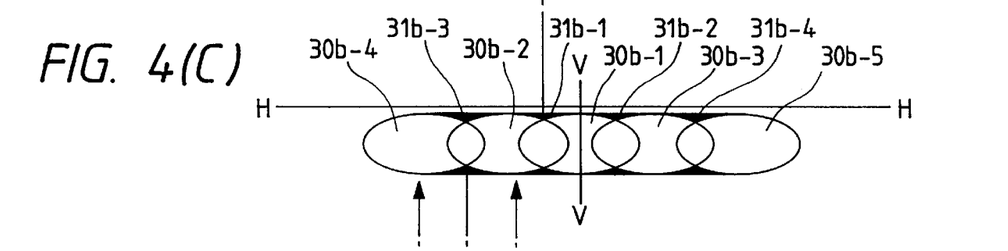
FIG. 4(C) is an illustration which shows a light-distributed zone formed by light emitted from a middle exit surface of a light-distributing lens.
Figure 4D:
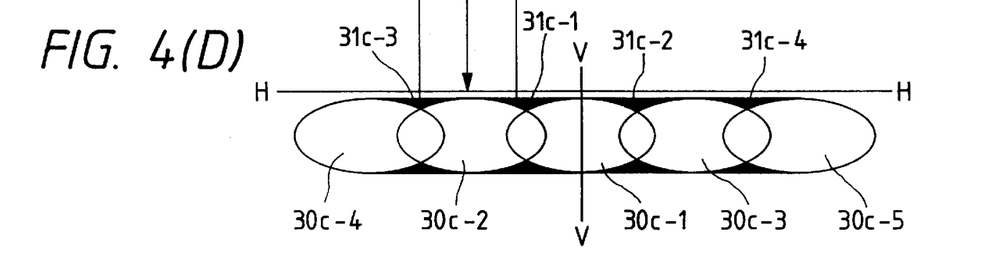
FIG. 4(D) is an illustration which shows a light-distributed zone formed by light emitted from an upper exit surface of a light-distributing lens.

The light-distributed zone 30a formed by the light emitted from the lower exit surface 24a, as shown in FIG. 4(B), consists of a direct light-distributed portion 30a-1 and reflected light-distributed portions 30a-2, 30a-3, 30a-4, and 30a-5 which are arranged horizontally at both sides of the direct light-distributed portion 30a-1 and partially overlap with each other. The direct light-distributed portion 30a-1 is formed by a portion of the light transmitted directly from the entrance surface 21 without undergoing total reflection on the lower reflecting portions 22a and 23a. The reflected light-distributed portions 30a-2 to 30a-5 are formed by a portion of the light transmitted from the entrance surface 21 which have undergone total reflection on the lower reflecting portions 22a and 23a. Similarly, the light-distributed zone 30b formed by the light emitted from the middle exit surface 24b, as shown in FIG. 4(C), consists of a direct light-distributed portion 30b-1 and reflected light-distributed portions 30b-2, 30b-3, 30b-4, and 30b-5 which are arranged horizontally at both sides of the direct light-distributed portion 30b-1 and partially overlap with each other. The direct light-distributed portion 30b-1 is formed by a portion of the light transmitted directly from the entrance surface 21 without undergoing total reflection on the middle reflecting portions 22b and 23b. The reflected light-distributed portions 30b-2 to 30b-5 are formed by a portion of light transmitted from the entrance surface 21 which have undergone total reflection on the lower reflecting portions 22b and 23b. Similarly, the light-distributed zone 30c formed by the light emitted from the upper exit surface 24c, as shown in FIG. 4(D), consists of a direct light-distributed portion 30c1 and reflected light-distributed portions 30c-2, 30c-3, 30c-4, and 30c-5 which are arranged horizontally at both sides of the direct light-distributed portion 30c-1 and partially overlap with each other. The direct light-distributed portion 30c-1 is formed by a portion of the light transmitted directly from the entrance surface 21 without undergoing total reflection on the middle reflecting portions 22c and 23c. The reflected light-distributed portions 30c-2 to 30c-5 are formed by a portion of the light transmitted from the entrance surface 21 which have undergone total reflection on the lower reflecting portions 22c and 23c.

In all the three light-distributed zones 30a, 30b, and 30c, dark areas are, as can be seen in FIGS. 4(B) to 4(C), formed at upper and lower sides of overlapped portions of the light-distributed portions 30a-1 to 30c-5, however, they are illuminated by adjacent one of the light-distributed zones 30a to 30c. Specifically, the dark areas 31b-1 and 31b-2, as shown in FIG. 4(C), formed on the both sides of the direct light-distributed portion 30b-1 are overlapped with the reflected light-distributed portions 30a-2 and 30a-3 shown in FIG. 4(B), respectively, so that they are brightened. The dark areas 31b-3 and 31b-4, as shown in FIG. 4(C), formed between the reflected light-distributed portions 30b-2 and 30b-4 and between the reflected light-distributed portions 30b-3 and 30b-5 are overlapped with the reflected light-distributed portions 30c-2 and 30c-3 shown in FIG. 4(D), respectively, so that they are brightened. Similarly, the dark areas 31c-1 31c-2, 31c-3, and 31c-4, as shown in FIG. 4(D), are overlapped with the reflected light-distributed portions 30c-2, 30c-3, 30b-4, and 30b-5 shown in FIG. 4(B), respectively, so that they are brightened. This allows the luminance of a wide spread zone (i.e., a combination of the light-distributed zones 30a to 30c) to be changed gradually from the center.

Figure 5A:
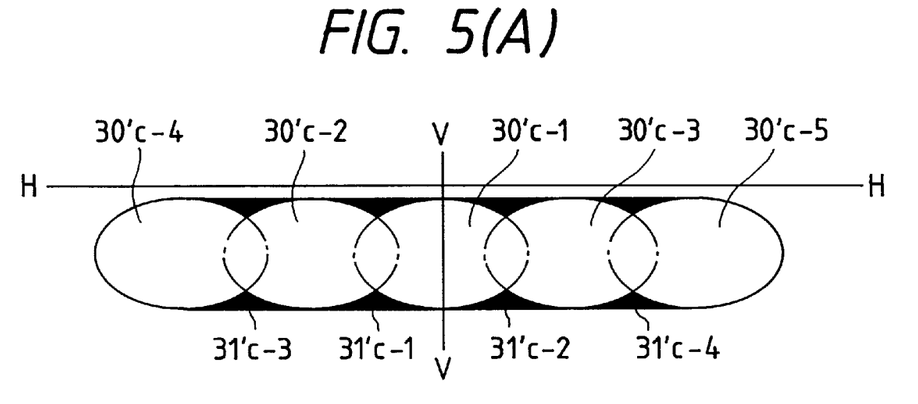
FIG. 5(A) is an illustration which shows a light-distributed zone formed by light emitted from an upper exit surface of a light-distributing lens if the upper exit surface is formed with a portion of a so-called cylindrical lens without a concave portion.
Figure 5B:
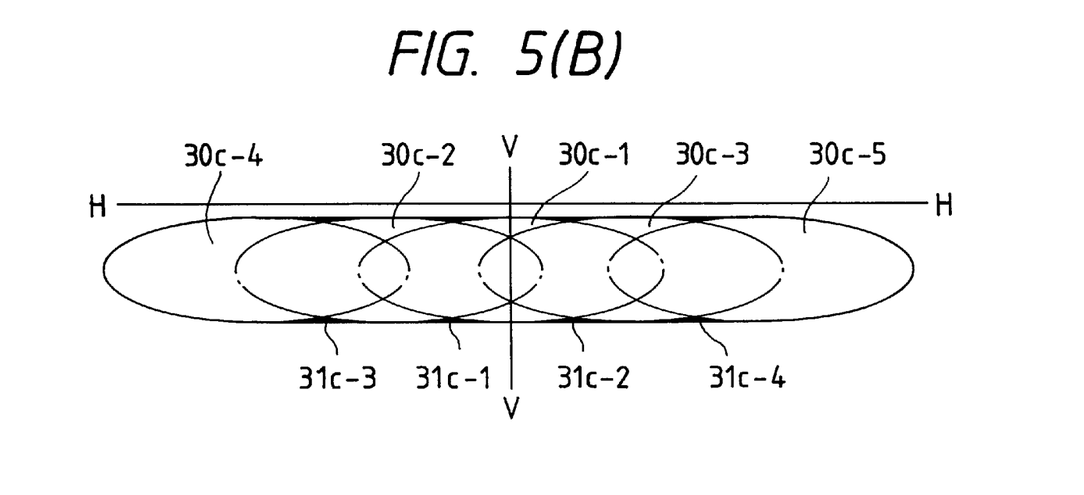
FIG. 5(B) is an illustration which shows a light-distributed zone formed by light emitted from an upper exit surface of a light-distributing lens having a concave portion.

The upper exit surface 24c forms, as discussed above, the concave ens. The light-distributed zone 30c therefore has a greater horizontal expanse as compared with when the upper exit surface 24c does not have the concave portion. Specifically, if the upper exit surface 24c is formed with a portion of the so-called cylindrical lens without the concave portion, dark areas 31'c-1, 31'c-2, 31'c-3, and 31'c-4, as shown in FIG. 5(A), formed between the direct light-distributed portion 30'c-1 and the adjacent reflected light-distributed portions 30'c-2 and 30'c-3, between the reflected light-distributed portions 30'c-2 and 30'c-4, and between the reflected light-distributed portions 30'c-3 and 30'c-5 becomes relatively great. At the same time the direct light-distributed portion 30c-1 and the reflected light-distributed portions 30c-2 to 30c-5 of the lightdistributed zone 30c, as shown in FIG. 5(B), expand horizontally so that dark areas 31c-1 to 31c-4 become relatively small, thereby resulting in even brightness of the light-distributed zone 30c.

Figure 6:
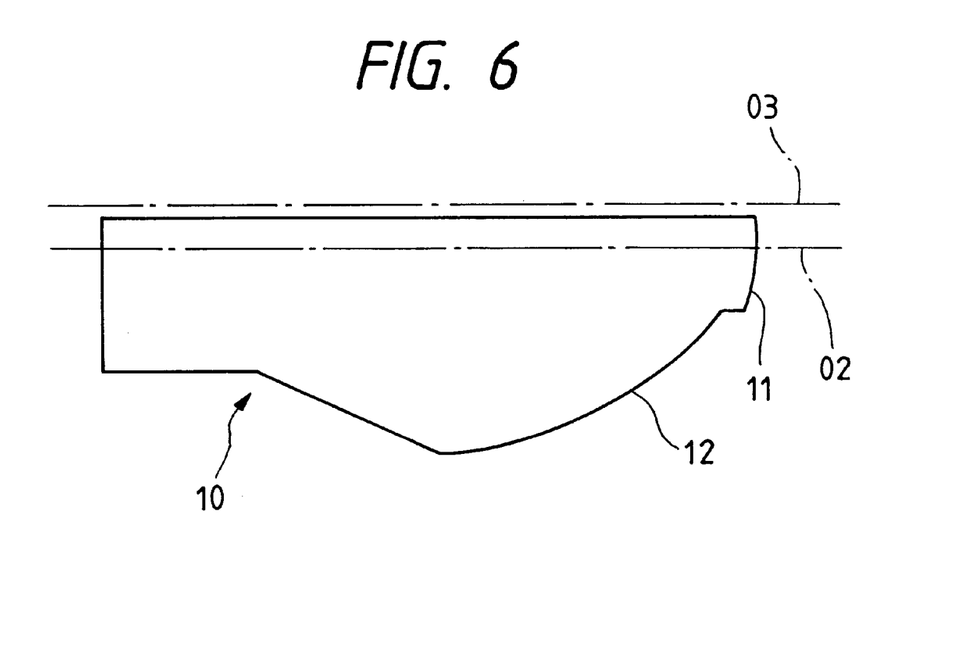
FIG. 6 is a horizontal cross section which shows a high intensity zone-forming lens of a light-distributing lens.
Figure 7:
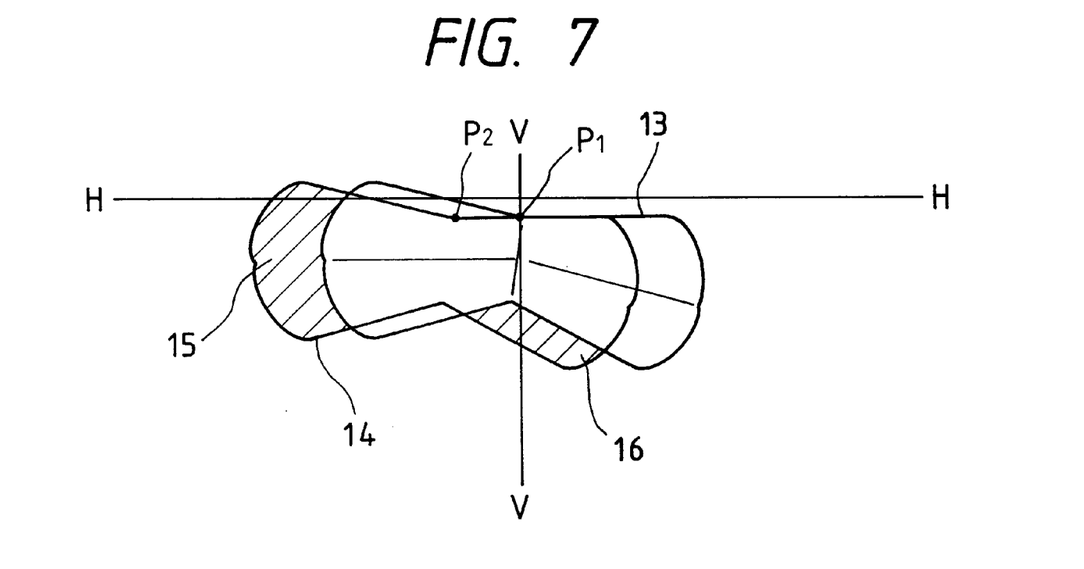
FIG. 7 is an illustration which shows light-distributed patterns formed by a high intensity zone-forming lens of a light-distributing lens.

The high intensity zone-forming lens 10, as can be seen in FIG. 1, substantially corresponds to a quarter of a conical lens which is derived by dividing the conical lens horizontally into halves and further dividing one of the halves vertically into halves along the longitudinal center line. The high intensity zone-forming lens 10 includes two exit surfaces 11 and 12 both having functions of gathering light in vertical and horizontal directions. The exit surface 11 has a center line 02 (i.e., an optical axis), as shown in FIG. 6, which is so determined that it passes through the vertical line V—V lying on the center $P_1$ of a partial high intensity zone 13 as shown in FIG. 7. The exit surface 12 has a center line 03 (i.e., an optical axis), as shown in FIG. 6, which is determined so that the center $P_2$ of a partial high intensity zone 14, as shown in FIG. 7, is shifted from the vertical line V—V to the left (in view of traveling under traffic regulations that automotive vehicles should travel on the left lane on a road). This allows dark areas 15 and 16, as depicted in FIG. 7, which are formed outside the partial high intensity zone 13, to be brightened by the partial high intensity zone 14, so that the high intensity zone formed by the high intensity zone-forming lens 10 has an optimum light-distributed pattern which gradually changes in brightness.

Figure 8:
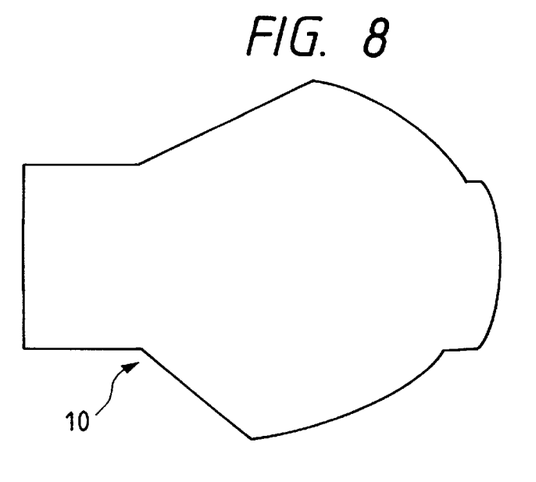
FIG. 8 is a horizontal cross section which shows a modification of the high intensity zone-forming lens shown in FIG. 6.

The high intensity zone-forming lens 10 may be, as shown in FIG. 8, formed with one of halves into which the conical lens is divided vertically.

Figure 9:
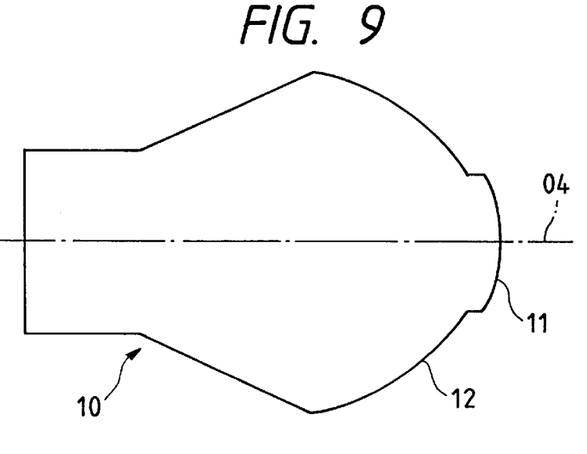
FIG. 9 is a horizontal cross section which shows another modification of the high intensity zone-forming lens shown in FIG. 6.
Figure 10:
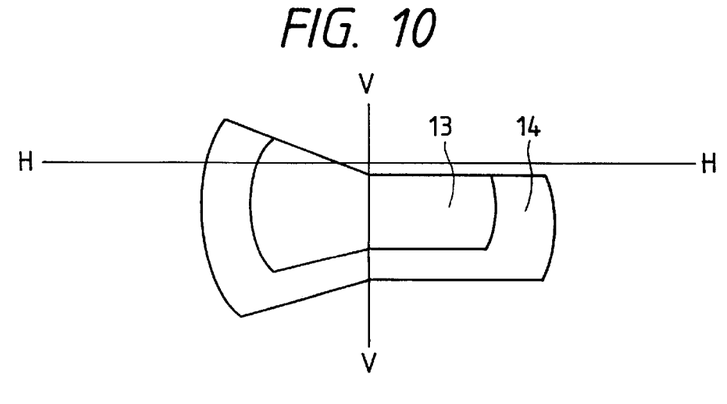
FIG. 10 is an illustration which shows light-distributed patterns formed by the high intensity zone-forming lens of FIG. 9.

FIG. 9 shows a modification of the high intensity zone-forming lens 10 which is formed by dividing a conical lens vertically into halves. The high intensity zone-forming lens 10 has a common center line 04 (i.e., an optical axis) for the exit surfaces 11 and 12 and also has the focal length at the side of the exit surface 11 which is longer than that at the side of the exit surface 12. This allows the partial high intensity zone 13 formed by light emitted from the exit surface 11 to lie, as shown in FIG. 10, inside the partial high intensity zone 14 formed by light emitted from the exit surface 12. Thus, the high intensity zone formed by the high intensity zone-forming lens 10 has an even distribution of illuminance as a whole. The embodiment shown in FIG. 9 may be used with the high intensity zone-forming lens, as discussed in the previous embodiment, which corresponds to a quarter of a conical lens. Additionally, a combination of structures shown in FIGS. 6 and 9 may be used. For example, the exit surface of the high intensity zone-forming lens 10 is divided into three sections so that two of the sections have a common optical axis, and the third section has a different optical axis. The high intensity zone-forming lens 10 may have either of the shapes shown in FIGS. 6 and 8.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A wide-spread zone-forming lens for a head lamp of a vehicle, comprising:

an entrance surface receiving light from a light source;

an exit surface emitting light entering said entrance surface, said exit surface formed opposite said entrance surface along a horizontal line extending in a lengthwise direction of said wide-spread zone-forming lens; and a pair of reflecting side surfaces directing a portion of light entering said entrance surface to said exit surface by total reflection, said pair of reflecting side surfaces formed between said entrance surface and said exit surface and include at least a first and second pair of reflecting side portions arranged in a vertical direction substantially perpendicular to the horizontal line of said wide-spread zone-forming lens, said first and second pair of reflecting side portions forming a first and second light-distributed zone disposed ahead of said exit surface, wherein each said first and second light distributed zone includes, a direct light-distributed zone, defined by a portion of light transmitted directly from said entrance surface without being totally reflected by the reflecting side surfaces;

a plurality of reflected light-distributed zones, formed on both sides of the direct light-distributed zone and defined by a portion of light transmitted from said entrance surface being totally reflected by the reflecting side surfaces; and a first reflecting side portion angle, formed by the respective first pair reflecting side portions along the horizontal direction of said wide-spread zone-forming lens, differing in degree from a second reflecting side portion angle, formed by the respective second pair reflecting side portions, wherein each of a plurality of dark areas formed outside and between said direct light-distributed and reflected light-distributed zones of said first light-distributed zone are brightened by one of said direct light-distributed and reflected light-distributed zones of said second light-distributed zone.

2. The wide-spread zone-forming lens set forth in claim 1, wherein said exit surface includes a first and second curved surface emitting light transmitted from said first and second pairs of reflecting side portions, respectively, each of said curved surfaces having curvatures which differ in degree from each other.

3. The wide-spread zone-forming lens set forth in claim 2, wherein said first and second curved surfaces are curved in the vertical direction of said wide-spread zone-forming lens, and the curvatures of said first and second curved surfaces differ in degree from each other, wherein the light respectively emitted from said first and second curved surfaces have different focal lengths.

4. A wide-spread zone-forming lens for a head lamp of a vehicle, comprising:

an entrance surface receiving light from a light source;

an exit surface emitting light entering said entrance surface, said exit surface formed opposite said entrance surface along a horizontal line extending in a lengthwise direction of said wide-spread zone-forming lens; and a pair of reflecting side surfaces directing a portion of light entering said entrance surface to said exit surface by total reflection, said pair of reflecting side surfaces formed between said entrance surface and said exit surface and include a first, second, and third pair of reflecting side portions arranged in a vertical direction substantially perpendicular to the horizontal line of said wide-spread zone-forming lens, said first, second, and third pair of reflecting side portions forming a first, second, and third light-distributed zone disposed ahead of said exit surface, wherein each of said first, second, and third light-distributed zone includes, a direct light-distributed zone, defined by a portion of light transmitted directly from said entrance surface without being totally reflected by the reflecting side surfaces;

a plurality of reflected light-distributed zones, formed on both sides of the direct light-distributed zone and defined by a portion of light transmitted from said entrance surface being totally reflected by the reflecting side surfaces; and a first reflecting side portion angle, formed by the respective first pair reflecting side portions along the horizontal direction of the light-distributing lens, differing in degree from a second reflecting side portion angle, formed by the respective second pair reflecting side portions, wherein each of a plurality of dark areas formed outside and between said direct light-distributed and reflected light-distributed zones of said first light-distributed zone are brightened by one of said direct light-distributed and reflected light-distributed zones of said second light-distributed zone.

5. The wide-spread zone-forming lens set forth in claim 4, wherein said exit surface includes first, second, and third curved surfaces emitting light transmitted from said first, second, and third pairs of reflecting side portions, respectively, each of said curved surfaces having curvatures which differ in degree from each other along the vertical direction of said wide-spread zone-forming lens.

6. A light-distributing lens for a head lamp of a vehicle, comprising:

an entrance surface receiving light from a light source;

an exit surface emitting light entering said entrance surface, said exit surface formed opposite said entrance surface along a horizontal line extending in a lengthwise direction of said wide-spread zone-forming lens; and a pair of reflecting side surfaces directing a portion of light entering said entrance surface to said exit surface by total reflection, said pair of reflecting side surfaces formed between said entrance surface and said exit surface and include at least a first and second pair of reflecting side portions arranged in a vertical direction substantially perpendicular to the horizontal line of said wide-spread zone-forming lens, said first and second pair of reflecting side portions forming a first and second light-distributed zone disposed ahead of said exit surface, and wherein said exit surface includes a first and second curved surface emitting light transmitted from said first and second pair of reflecting side portions, respectively, each of the curved surfaces having a horizontal curvature which differ in degree from each other and the light respectively emitted from said first and second curved surfaces having different focal lengths along the horizontal direction of said wide-spread zone-forming lens, and wherein each of said first and second light distributed zone includes, a direct light-distributed zone, defined by a portion of light transmitted directly from said entrance surface without being totally reflected by the reflecting side surfaces;

a plurality of reflected light-distributed zones, formed on both sides of the direct light-distributed zone and defined by a portion of light transmitted from said entrance surface being totally reflected by the reflecting side surfaces; and a first reflecting side portion angle, formed by the respective first pair reflecting side portions along the horizontal direction of said wide-spread zone-forming lens, differing in degree from a second reflecting side portion angle, formed by the respective second pair reflecting side portions, wherein each of a plurality of dark areas formed outside and between said direct light-distributed and reflected light-distributed zones of said first light-distributed zone are brightened by one of said direct light-distributed and reflected light-distributed zones of said second light-distributed zone.

* * * * *